United States Patent [19]

Bushell et al.

[11] 4,157,125

[45] Jun. 5, 1979

[54] ALL-WHEEL-DRIVE VEHICLE

[76] Inventors: Patricia M. Bushell, Blue Hills, Glebe Rd., Headley, Bordon, Hampshire; Robert C. Bushell, 20 Melville Ct., Guildown Rd., Guildford, Surrey, both of England

[21] Appl. No.: 825,308

[22] Filed: Aug. 17, 1977

[30] Foreign Application Priority Data

Aug. 18, 1976 [GB] United Kingdom ............... 34307/76

[51] Int. Cl.² .............................................. B62D 11/04
[52] U.S. Cl. .................................. 180/26 A; 180/66 R
[58] Field of Search ................. 180/6.3, 66 R, 26 A, 180/44 F

[56] References Cited

U.S. PATENT DOCUMENTS

| 2,774,434 | 12/1956 | Ferris | 180/6.3 |
| 2,942,677 | 6/1960 | Gray | 180/26 A |
| 3,405,776 | 10/1968 | Hertell | 180/6.3 |
| 3,550,708 | 12/1970 | Paramythioti | 180/6.3 X |
| 3,759,295 | 9/1973 | Dence | 180/6.3 X |
| 3,900,075 | 8/1975 | Chichester | 180/6.3 |
| 3,998,287 | 12/1976 | Paramythioti | 180/26 A X |

FOREIGN PATENT DOCUMENTS

| 44009 | 12/1960 | Czechoslovakia | 180/26 A |
| 752953 | 7/1956 | United Kingdom | 180/26 A |

*Primary Examiner*—Albert J. Makay
*Assistant Examiner*—Terrance L. Siemens
*Attorney, Agent, or Firm*—Lerner, David, Littenberg & Samuel

[57] ABSTRACT

An all-wheel-drive vehicle, particularly a fork-lift truck suitable for use on rough terrain, with at least one wheel steerable over an angle of substantially 90° in each direction. To avoid wheel slip, drive motors of the vehicle are arranged to provide a differential action between steerable and non-steerable wheels at intermediate steering angles, and to transmit drive only to the steerable wheel or wheels at large steering angles approaching or at 90°. The drive motors are preferably hydrostatic with an individual hydraulic motor for each wheel.

8 Claims, 3 Drawing Figures

ALL-WHEEL-DRIVE VEHICLE

This invention relates to all-wheel-drive vehicles suitable for use on rough terrain, and is particularly concerned with vehicles such as fork-lift trucks having a wheel or wheels steerable over a steering angle of substantially 90° in each direction.

On a rough-terrain all-wheel-drive vehicle, particularly one where the weight distribution is liable to considerable change, the front and rear wheels should have synchronous speed during straight-line travel irrespective of weight distribution or ground conditions. However, if the steerable wheel or wheels at one end of the vehicle are positioned to a steering angle of say 30° or more then synchronous speeds no longer apply. The requirement then is for a differential or limited-slip differential action between the wheels at the ends of the vehicle to permit the steering wheel or wheels to go faster thereby obviating or lessening wheel slip. In the extreme third condition when the angle of the steerable wheel or wheels exceeds 75° and approaches 90°, even if the differential action permits non-skid wheel speeds, the driving wheels at the non-steering end of the vehicle will be dragging or pushing the steering wheel on wheels sidewards. In these circumstances if the tractive effort is removed from the non-steerable wheels the vehicle will be able to drive the steerable wheel or wheels around the non-steerable wheels whose centre will remain stationary.

According to the present invention, there is provided an all-wheel-drive vehicle having at least three wheels, at least one of which is steerable over a steering angle of substantially 90° in each direction, and drive means automatically responsive to the steering angle of said at least one steerable wheel for providing synchronous drive to all wheels for zero or small steering angles, a differential action between the steerable and non-steerable wheels for intermediate steering angles whereby the or each steerable wheel is driven faster than the or each non-steerable wheel, and drive only to the or each steerable wheel for steering angles at or approaching 90°.

Preferably, the drive means comprises a hydrostatic system with an individual hydraulic motor for each wheel, fluid pumping means for supplying fluid to said motors, and control valves automatically actuable in response to the steering angle of said at least one steerable wheel to control the supply of fluid to said motors.

The fluid pumping means may comprise a single pump feeding into a fixed-ratio flow divider supplying said motors, or a suitable double pump, one pump supplying each axle.

However, the drive means may take other forms, such as an electrical system with an individual electric motor for each wheel and a generator or battery supplying the motors via suitable control devices.

The invention will now be more particularly described, by way of example only, with reference to the accompanying drawings, in which.

Figure 1:
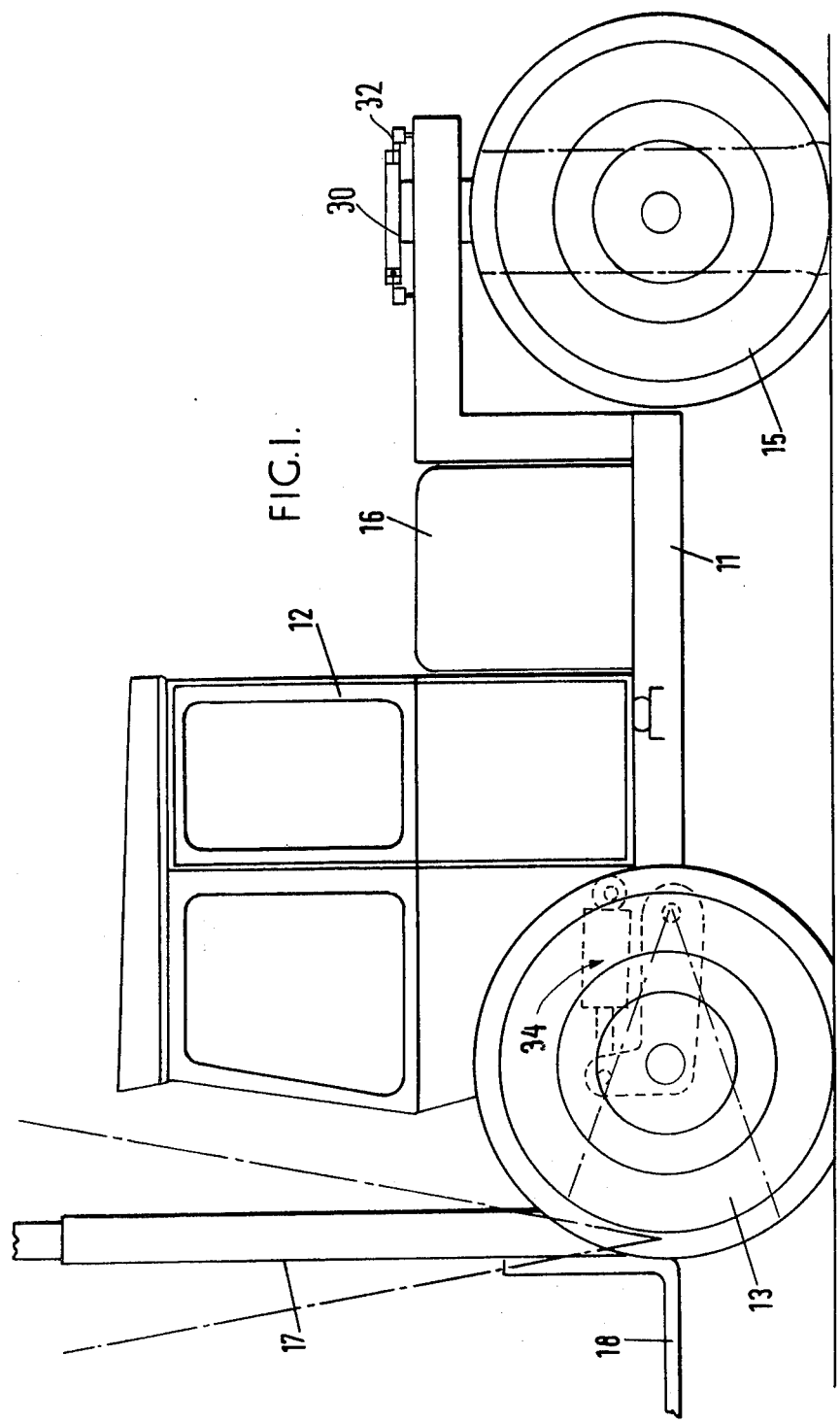
FIG. 1 is a side view of an all-wheel-drive fork-lift truck suitable for use on rough terrain.
Figure 2:
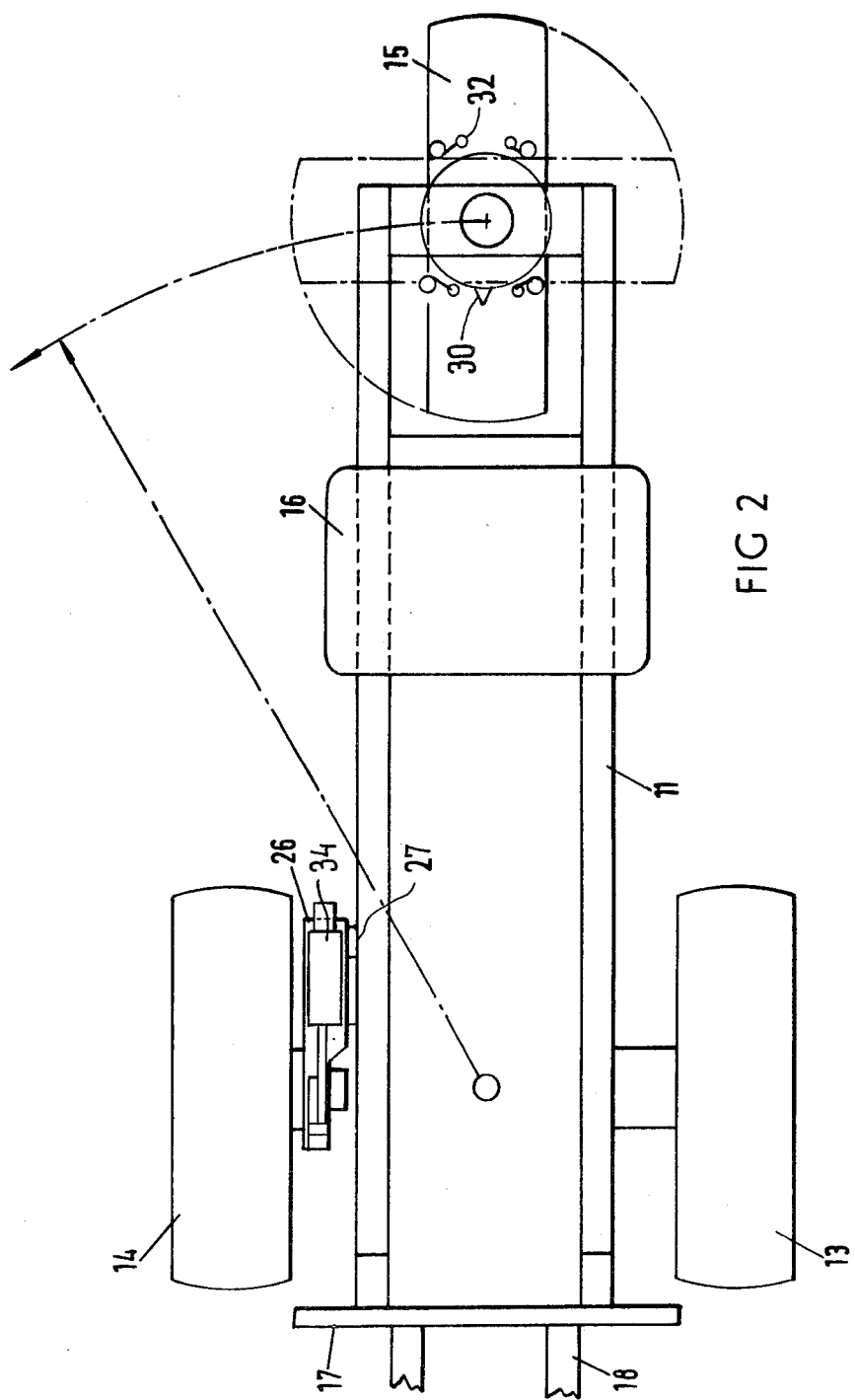
FIG. 2 is a plan view of the truck with driver's cab omitted.
Figure 3:
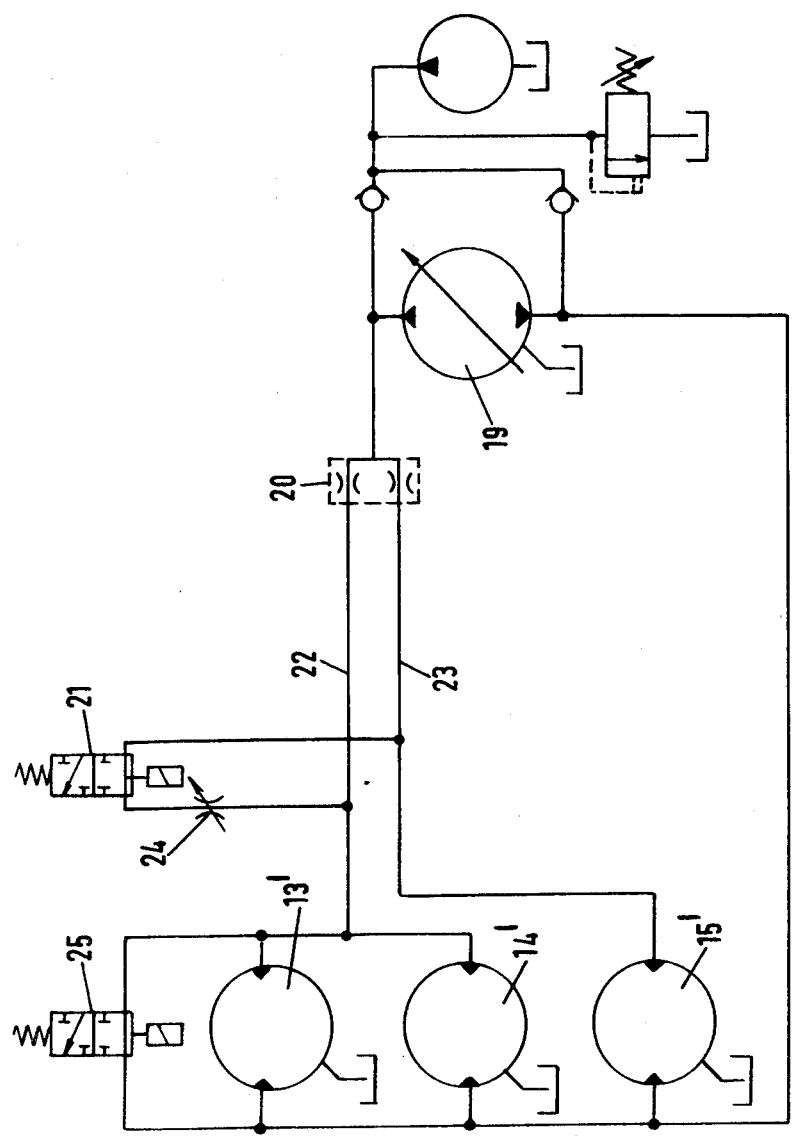
FIG. 3 is a simplified circuit diagram of a hydrostatic system for driving the truck.

The fork-lift truck illustrated in FIGS. 1 and 2, comprises a chassis 11 with a driver's cab 12, two driven forward wheels 13 and 14 which are non-steerable, a steerable rearward wheel 15, a drive motor 16, mast 17 and lifting fork 18. The wheels 13, 14 and 15 are provided with respective hydraulic motors 13′, 14′ and 15′ driven by the hydrostatic system illustrated in FIG. 3. The circuit is of the closed supercharged type with a variable delivery pump 19, which is driven by the drive motor 16, supplying the three hydraulic motor 13′, 14′ and 15′ via a two-way rotary flow divider 20 which provides proportional fluid supply to each motor for synchronous drive at zero or small steering angles of the steerable wheel 15.

For intermediate steering angles of the wheel 15, when a first pre-determined steering angle of 30° to 35° is exceeded, a limited slip differential action is required between the wheels 13, 14 and the wheel 15 to permit the wheel 15 to increase speed relative to the wheels 13, 14, thereby reducing or eliminating wheel slip. This is achieved by a control valve 21 automatically opening to bridge the lines 22 and 23 supplying the motors 13′, 14′ and the motor 15′ respectively.

Additionally, this differential action may be limited if required by a fixed or adjustable flow control valve 24.

At steering angles of the wheel 15 at or approaching 90°, i.e. exceeding about 75°, it is necessary for the wheels 13, 14 to be free of tractive effort so as not to push the wheel 15 sideways, whilst the wheel 15 must still be driven. This is achieved by the control valve 21 automatically closing and another control valve 25 opening to provide a by-pass for the fluid supply in the line 22 to the motors 13′, 14′. In this way the truck may be made to turn in a circle of radius equal to its own wheel-base, driven by the steerable wheel 15 only.

The automatically actuated control valves 21 and 25 may be operated directly from a cam (not shown) movable with the steerable wheel 15, or the cam may act on microswitches controlling respective solenoids arranged to actuate the valves.

Referring to FIG. 2, the wheel 14 is mounted on an arm 26 pivoted to the chassis 11 at 27 and displaceable in a vertical plane by means of a hydraulic jack (not shown). This allows the whole truck, including mast 17, forks 18 and load to be tilted laterally in either direction, or for the truck to be kept level over uneven terrain.

We claim:

1. An all-wheel-drive vehicle having at least three wheels, at least one of which is steerable over a steering angle of substantially 90° in each direction, drive means automatically responsive to the steering angle of said at least one steerable wheel for providing synchronous drive to all wheels for zero or small steering angles, differential action means between the steerable and non-steerable wheels for intermediate steering angles whereby the or each steerable wheel is driven faster than the or each non-steerable wheel, and drive is imparted only to the or each steerable wheel for steering angles at or approaching 90°, said drive means further including a hydrostatic system with an individual hydraulic motor for each wheel, fluid pumping means for supplying fluid to said motors, said differential action means including control valves automatically actuable in response to the steering angle of said at least one steerable wheel to control the supply of fluid to said motors, said fluid pumping means being arranged to deliver proportionate fluid supplies to the motors of the steerable and non-steerable wheels for synchronous drive at zero or small steering angles, one of said control valves being arranged automatically to open when a first pre-determined steering angle is exceeded and thereby bridge the fluid supplies for the steerable and non-steerable wheels to provide said differential action at intermediate steering angles and to close when a second pre-determined steering angle is exceeded, and another of said control valves being arranged automatically to open when said second pre-determined steering angle is exceeded and to provide a by-pass for the fluid supply for the non-steerable wheel or wheels such that only the steerable wheel or wheels are driven at steering angles at or approaching 90°.

2. A vehicle according to claim 1 wherein said first and second pre-determined steering angles are 30° to 35° and about 75° respectively.

3. A vehicle according to claim 1 wherein said fluid pumping means comprises a single pump feeding into a fixed-ratio flow divider supplying said motors.

4. A vehicle according to claim 1 wherein said pump operates in a closed circuit and is supercharged.

5. A vehicle according to claim 1 wherein said control valves are automatically actuable by means of a cam movable with the steering wheel or wheels.

6. A vehicle according to claim 1 wherein the vehicle is a fork-lift truck suitable for use on rough terrain with a pair of non-steerable forward wheels and a single steerable rearward wheel.

7. A vehicle according to claim 6 wherein one of said forward wheels is mounted on a pivotable arm which is displaceable in a vertical plane to provide for tilting of the vehicle.

8. A vehicle according to claim 7 wherein the pivotable arm is displaceable by means of a hydraulic jack.

* * * * *